Jan. 4, 1966     H. W. MULCAHY ETAL     3,227,288
DRAFT GEAR
Filed July 22, 1963                       3 Sheets-Sheet 1
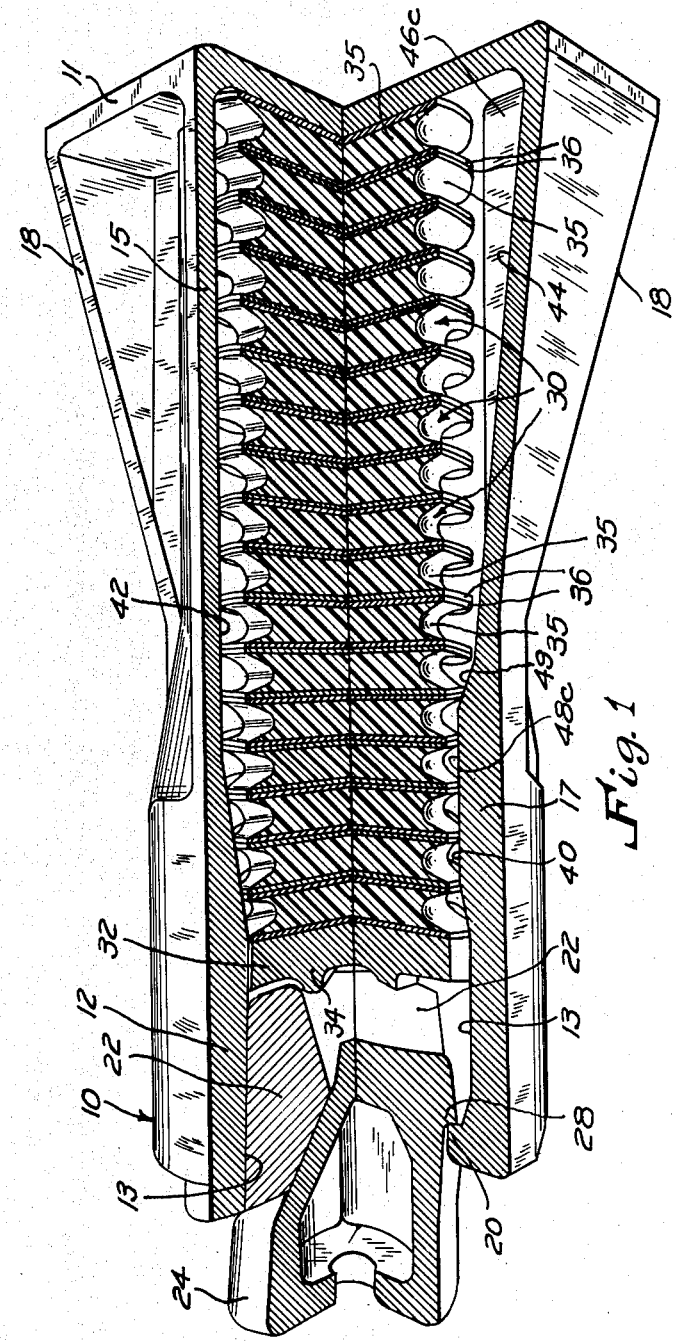
INVENTORS
Harry W. Mulcahy
William D. Wallace
Donald R. Holm
BY
Edward F. Jurow Atty.

Jan. 4, 1966 H. W. MULCAHY ETAL 3,227,288
DRAFT GEAR
Filed July 22, 1963 3 Sheets-Sheet 2
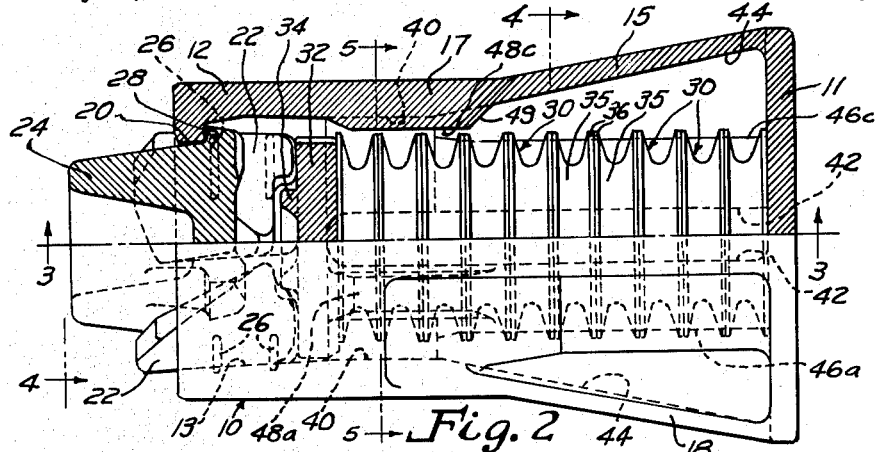
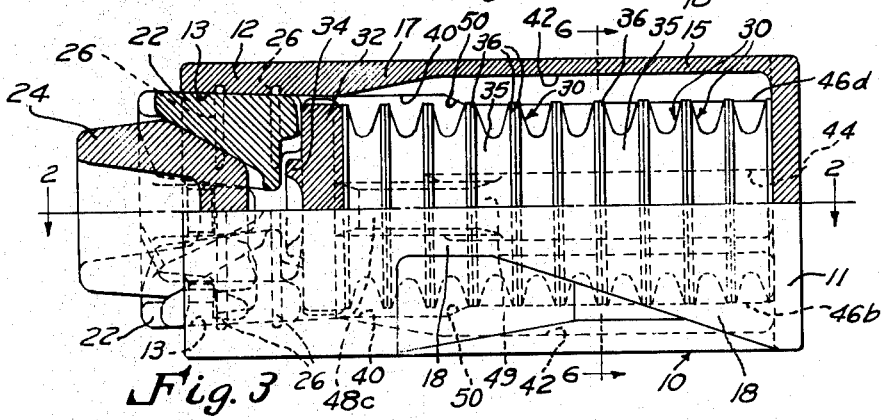
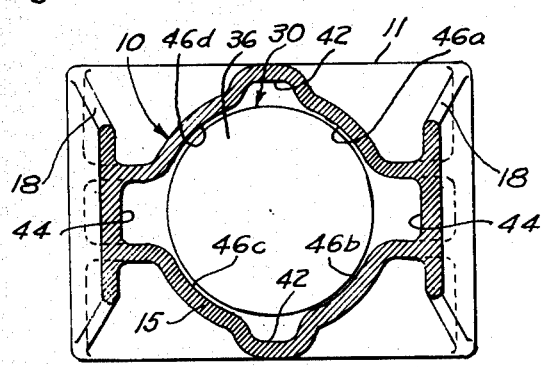
INVENTORS
Harry W. Mulcahy
William D. Wallace
Donald R. Holm
BY
Edward F. Jurow Atty.

INVENTORS
Harry W. Mulcahy
William D. Wallace
Donald R. Holm
BY
Edward F. Jurow Atty.

United States Patent Office 3,227,288
Patented Jan. 4, 1966

---

3,227,288
DRAFT GEAR
Harry W. Mulcahy, Chicago Heights, William D. Wallace, Homewood, and Donald R. Holm, Markham, Ill., assignors to W. H. Miner, Inc., Chicago, Ill., a corporation of Delaware
Filed July 22, 1963, Ser. No. 296,643
16 Claims. (Cl. 213—22)

The present invention relates to a draft gear and, more particularly, to a friction draft gear which utilizes a stack of resilient pads which resist inward movement of the friction shoes thereof.

The general object of the present invention is to provide a new and improved friction draft gear wherein the resilient pads provide greater shock-absorbing capacity, in the order of approximately 50,000 to 60,000 foot-pounds at a reaction level of 500,000 pounds, than comparable A.A.R. standard friction draft gears utilizing coil springs which are rated at an average capacity of approximately 23,000 foot-pounds at a reaction level of 350,000 pounds.

Another important object of the present invention is to provide a new and improved friction draft gear having an axially bored housing closed at one end and characterized by a tapered inner friction surface of rounded hexagonal cross section at its open end for receiving a series of friction shoes and by a generally cylindrical inner surface spaced inwardly thereof and terminating at its closed end, and a series of circular elastometric cushioning pads disposed in the housing for resisting inward movement of the friction shoes and being guidingly retained in stacked columnar relationship by the generally cylindrical inner surface of the housing.

Another important object of the present invention is to provide a new and improved friction draft gear housing of the character described wherein a transition inner wall configuration is provided between the generally hexagonal inner friction surface and the generally cylindrical inner surface for blending same one into the other.

A more detailed object of the present invention is to provide a new and improved friction draft gear housing of of the character described wherein the generally cylindrical inner surface is defined by a series of circumferentially spaced longitudinally extending guide formations having arcuate inner surfaces and wherein the transition wall configuration is characterized by a non-tapered generally hexagonal sleeve portion, by angular shoulder portions which aid in blending the hexagonal sleeve configuration into the generally cylindrical inner surface, and by a series of circumferentially spaced longitudinally extending guide ribs having arcuate inner surfaces, which ribs define a longitudinal extension of the generally cylindrical inner surface.

A still further important object of the present invention is to disclose a new and improved friction draft gear of the character described having a generally circular follower plate disposed in the transition wall section between the inner ends of the friction shoes and the outer end of the stack of elastomeric pads and having peripheral guide means thereon for guiding engagement with the hexagonal sleeve portion of the transition wall section during longitudinal movement thereof.

Another object of the present invention is to disclose a new and improved friction draft gear of the character described having a series of inwardly directed wedge-engaging lugs at the open end of the housing with the circular pads being insertable through the open end of the housing by canting same past the lugs and with the periphery of the follower plate being notched in a manner facilitating insertion thereof into the open end of the housing past the lugs.

Another object of the present invention is to provide an economical, easily assembled, and trouble-free friction draft gear of minimum size and weight and having a high maximum capacity for use in railway draft riggings and the like.

Still other and further objects of the present invention will be obvious to a person skilled in the art upon examination of the accompanying drawings and reading of the specification and claims following hereinafter.

In the drawings:

FIGURE 1 is a perspective view of a friction draft gear embodying the invention with the upper near quarter section thereof cut away to show the interior structure thereof in section;

FIGURE 2 is a top plan view of another draft gear embodying the invention with the portion of the gear on the far side of the center line being shown in horizontal section taken generally on the line 2–2 of FIGURE 3;

FIGURE 3 is a side elevational view of the friction draft gear of FIGURE 2 with the portion thereof above the center line being shown in vertical section taken generally on the line 3–3 of FIGURE 2;

FIGURE 6 is a vertical section taken generally on the line 6–6 of FIGURE 3.

Figure 5:
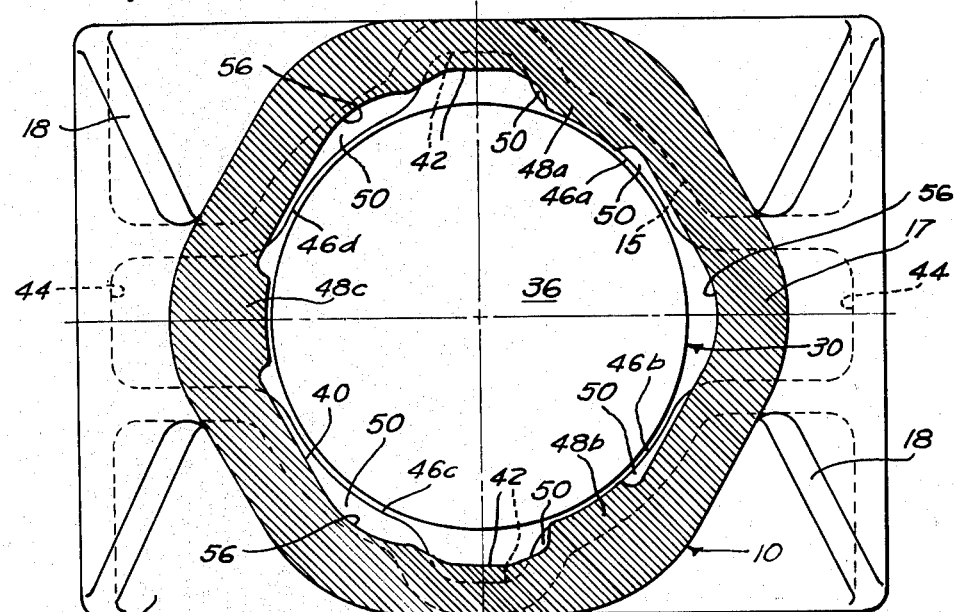
FIGURE 5 is an enlarged scale vertical section taken generally on the line 5–5 of FIGURE 2.

As best illustrated in FIGURES 1, 2 and 3, friction draft gears embodying the present invention include an axially bored housing or casing 10 of generally hexagonal outer configuration with one end thereof being closed by a fixed enlarged rectangular end wall or plate 11. The length of the housing 10 may vary in accordance with the length of the center sill pocket in which same is to be mounted. The housing 10 is provided adjacent its open end with a thick-walled friction shell section 12 of rounded hexagonal cross section, with inner friction surfaces 13 of the friction shell section 12 tapering from its open outer end and converging in a direction toward the closed end of the housing 10. Spaced inwardly of the friction shell section 12, the housing 10 is provided with a section 15 which terminates at the end wall 11 and is characterized by a thinner wall section and by a generally cylindrical inner configuration. The friction shell section 12 and the housing section 15 are integrally interconnected by a transition wall section 17 which serves to blend the generally hexagonal friction shell section 12 and the generally cylindrical housing section 15 into each other both internally and externally. Suitable integral external supporting rib structures 18 are provided on opposite sides of the housing 10 between the transition wall section 17 and the side edges of he end wall 11. The open end of the housing 10 is provided with a series of three circumferentially spaced inwardly turned flange-like lugs 20 for a purpose to be described.

As is well known in the art, a series of three friction shoes 22 is fitted in the friction shell section 12 in circumferentially spaced relation and in sliding friction-producing engagement with the inner friction surfaces 13 of the friction shell section 12. The shoes 22 define an outwardly opening pocket for receiving the inner end of a known type wedge 24.

In friction draft gears of this general type, in addition the fractional resistance developed in the friction shell section 12 during inward movement of the friction shoes 22 and the wedge 24, resilient means are provided in the inner end of the housing 10 for resisting inward movement thereof whereby to cushion buff or draft forces applied to the draft gear. As illustrated in FIGURES 2 and 3, the friction surfaces 13 may be provided with a series of longitudinally spaced and circumferentially extending grooves 26 filled with lead or other suitable material.

To retain the wedge 24 and the shoes 22 in the open end of the housing 10, despite the outward biasing action of the resilient means therein, the inner end of the wedge 24 is provided with a series of circumferentially spaced outwardly projecting flange-like lugs 28 which correspond in number and spacing to the inwardly projecting lugs 20 at the open end of the housing 10. During assembly of the draft gear, the lugs 28 on the wedge 24 are engaged behind or inwardly of the lugs 20 on the housing 10 whereby the wedge 24 and the shoes 22 are positively retained in assembled relationship in the housing 10.

In the present invention, the resilient means provided in the inner end of the housing 10 comprises a stack of circular compressible rubber or rubber-like elastomeric cushioning pads or units 30 which are seated against the inner face of the end plate 11. A generally circular follower plate 32 is disposed between the outer end of the stack of pads 30 and the inner ends of the friction shoes 22 and is adapted for longitudinal movement in the transition wall section 17 of the housing 10 to compress the stack of pads 30 when buff and draft forces are applied to the draft gear. The outer face of the follower plate 32 is provided inwardly of its periphery with an annular raised rim 34 which is adapted to be received in suitable recesses formed on the inner ends of the friction shoes 22. The cushioning pads 30 are insertable into the housing 10 through the open outer end thereof by canting same past the lugs 20 and have a diameter which is slightly less than the inner diameter of the generally cylindrical inner configuration of the housing section 15 whereby such configuration serves to guidingly retain the cushioning pads 30 in columnar stacker relationship during compression thereof in a longitudinal direction. Each cushioning unit 30 comprises a disc-shaped elastomer pad 35 which may be formed of natural rubber or a suitable synthetic rubber-like material such as neothane or polyurethane and which is interposed between and bonded to a pair of circular metal plates 36.

Upon assembly of the friction shoes 22 and the wedge 24 in the housing 10, the stack of cushioning pads 30 is precompressed, as illustrated in FIGURES 1, 2, and 3. To prevent outward bulging of the elastomer pads 35 beyond the peripheral edges of the metal plates 36 when the cushioning units 30 are under maximum compression, as at full closure of the draft gear, the peripheral edges of the elastomer pads 35 are indented as shown.

The novel internal structure of the friction draft gear housing 10 of the present invention which is characterized by a generally hexagonal friction shell section 12, by a section 15 having a generally cylinderical inner configuration for guidingly retaining the plurality of circular elastomeric pads 30 in stacked columnar relationship, and by a transition section 17 will now be described.

The internal configuration of the transition housing section 17 is characterized by a non-tapered rounded hexagonal sleeve portion 40 which extends inwardly from the inner end of the inwardly tapered rounded hexagonal friction shell section 12 and terminates adjacent the outer end of the generally cylindrical inner configuration of the housing section 15. As best illustrated in FIGURES 3 and 5, the sleeve portion 40 is interrupted at the top and bottom of the housing 10 by a pair of channel-like grooves 42 which extend inwardly of the housing from the outer end of the sleeve portion 40 and terminate at the end wall 11. The depth of the grooves 42 increases gradually through the length of the sleeve portion 40 after which the depth thereof remains constant. As best illustrated in FIGURES 2 and 5, the interior of the housing 10 is also provided with a pair of channel-like sides grooves 44 which extend inwardly of the housing from points adjacent the inner end of the sleeve portion 40 and which terminate at the end wall 11. The depth of the side grooves 44 increases gradually for the full length thereof in a direction toward the end wall 11 whereby to provide outwardly flared side grooves.

The top and bottom grooves 42 and the side grooves 44 define therebetween four circumferentially spaced longitudinally extending internal guide formations or ribs 46a, 46b, 46c and 46d which extend the full length of the housing section 15, which guide formations are provided with arcuate inner surfaces which define, as shown in FIGURE 6, a circumferentially interrupted or non-continuous inner cylindrical configuration having a diameter which is slightly greater than the diameter of the circular elastomeric cushioning units 30. The guide formations 46a, 46b, 46c and 46d thus embrace the cushioning units 30 and guidingly retain same in columnar stacked relationship during longitudinal movement thereof when same are compressed as upon the application of buff and draft forces to the draft gear.

As the outermost cushioning units 30 are normally disposed in the transition housing section 17, guide means are provided therein which define a longitudinal extension or continuation of the generally cylindrical guide configuration defined by the guide formations 46a, 46b, 46c and 46d in the housing section 15. As best illustrated in FIGURES 2 and 5, the hexagonal sleeve portion 40 of the transition housing section 17 is provided with a series of three internal circumferentially spaced longitudinally extending guide ribs or formations 48a, 48b and 48c having arcuate inner surfaces defining a circumferentially interrupted cylindrical inner configuration having a diameter equal to that of the cylindrical configuration of the housing section 15. The guide ribs 48a, 48b and 48c are disposed in three equidistantly spaced corners of the rounded hexagonal sleeve portion 40 in longitudinal alignment with the lugs 20 at the open end of the housing 10. The guide ribs 48a and 48b are longitudinally aligned with and contiguous to the guide formations 46a and 46b, respectively, whereby same blend into one another. As best illustrated in FIGURE 2, the inner end of the third guide rib 48c terminates in an outwardly angled shoulder 49 which serves to blend same into one of the flared channel-like side grooves 44.

The transition housing section 17 is further characterized by inwardly angled shoulder portions 50 at the inner end of the non-tapered hexagonal sleeve portion 40 which serve to blend this hexagonal configuration into the generally cylindrical inner configuration of the housing section 15 defined by the guide formations 46a, 46b, 46c and 46d. The shoulder portions 50 are spaced inwardly of the full closure position of the follower plate 32 so that there will be no interference therebetween.

Figure 4:
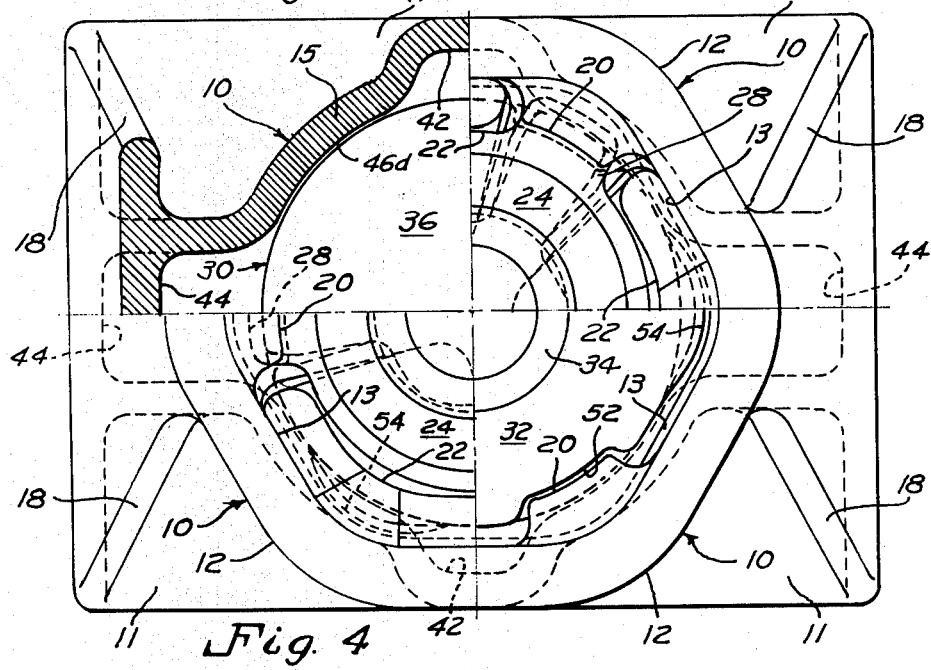
FIGURE 4 is an enlarged scale end view of the friction draft gear shown in FIGURES 2 and 3 with the upper right and lower left quarters thereof being in end elevation, with the lower right quarter thereof being in end elevation with the wedge and friction shoes removed, and with the upper left quarter thereof being in vertical section taken generally on the line 4–4 of FIGURE 2.

The generally circular follower plate 32 which is disposed between the inner ends of the friction shoes 22 and the outer end of the stack of cushioning units 30 for longitudinal movement between the opposite ends of the transition housing section 17 is provided along it peripheral edge with three circumferentially spaced notches 52, as best illustrated in the lower right quarter of FIGURE 4, which correspond in number, size and location to the three circumferentially spaced lugs 20 at the open end of the housing 10 whereby to facilitate insertion of the follower plate 32 into the housing through the open end thereof. For guiding the follower plate 32 in the non-tapered hexagonal sleeve portion 40 of the transition housing section 17, the periphery thereof is provided with three circumferentially spaced rounded projections 54 (FIGURE 4) which are spaced equidistantly between the three notches 52. The projections 54 are shaped for guiding engagement in the three rounded corners 56 (FIGURE 5) of the rounded hexagonal sleeve portion 40 remaining between the guide ribs 48a, 48b and 48c.

The novel friction draft gear housing 10 described and illustrated herein provides a housing of minimum size and weight for guidingly retaining a stack of circular elastomeric pads or cushioning units 30 in stacked columnar relationship. It has been found through testing that the friction draft gear of the present invention provides greater shock-absorbing capacity, in the order of approximately 50,00 to 60,000 foot-pounds at a reaction level of 500,000 pounds, than comparable A.A.R. standard friction draft gears utilizing coil springs which are rated at an average capacity of approximately 23,000 foot-pounds at a reaction level of 350,000 pounds.

Since changes can be made in the foregoing structural arrangement and different embodiments of the invention can be made without departing from the spirit and scope thereof, it is intended that all matters shown in the accompanying drawings and described hereinbefore shall be interpreted as illustrative and not in a limiting sense.

What is claimed as new is:

1. In a friction draft gear of the type which is characterized by a generally hexagonal housing having one end provided with a closure and an open opposite end provided with a tapered internal friction surface of rounded hexagonal cross section, by a series of friction shoes in the open end of said housing and operably associated with said friction surface thereof, and by a wedge member engageable with said shoes and adapted for actuating same upon movement thereof inwardly of said housing, the improvement which comprises, in combination therewith, a series of internal circumferentially spaced longitudinally extending guide formations having arcuate inner surfaces formed in said housing inwardly of said hexagonal friction surface and defining a non-continuous cylindrical configuration, a transition wall section disposed inwardly of and immediately adjacent to said hexagonal friction surface for blending same into said cylindrical configuration, and a stack of circular elastomeric pads disposed in said housing inwardly of said friction shoes resisting inward movement thereof and being guidingly retained in stacked columnar relationship by said cylindrical configuration defined by said guide formations.

2. In a friction draft gear of the type which is characterized by a generally hexagonal housing having one end provided with a closure and an open opposite end provided with a tapered internal friction surface of rounded hexagonal cross section, by a series of friction shoes in the open end of said housing and operably associated with said friction surface thereof, and by a wedge member engageable with said shoes and adapted for actuating same upon movement thereof inwardly of said housing, the improvement which comprises, in combination therewith, a series of internal circumferentially spaced longitudinally extending guide formations having arcuate inner surfaces formed in said housing inwardly of said hexagonal friction surface and defining a non-continuous cylindrical configuration, a transition wall section disposed inwardly of and immediately adjacent to said hexagonal friction surface for blending same into said cylindrical configuration, a stack of circular elastomeric pads disposed in said housing inwardly of said friction shoes for resisting inward movement thereof and being guidingly retained in stacked columnar relationship by said cylindrical configuration defined by said guide formations, and a generally circular follower having guide means formed on the periphery thereof guidingly disposed for longitudinal movement in said transition wall section intermediate said friction shoes and said stack of pads.

3. In a friction draft gear of the type which is characterized by a generally hexagonal housing having one end provided with a closure and an open opposite end provided with a tapered internal friction surface of rounded hexagonal cross section, by a series of friction shoes in the open end of said housing and operably associated with said friction surface thereof, and by a wedge member engageable with said shoes and adapted for actuating same upon movement thereof inwardly of said housing, the improvement which comprises, in combination therewith, a first series of internal circumferentially spaced longitudinally extending guide formations having arcute inner surfaces formed in said housing inwardly of said hexagonal friction surface and defining a generally cylindrical configuration, a transition inner wall section disposed inwardly of and immediately adjacent to said hexagonal friction surface for blending same into said generally cylindrical configuration, said transition wall section being characterized by a second series of internal circumferentially spaced longitudinally extending guide formations having arcuate inner surfaces which provide a longitudinal continuation of said generally cylindrical configuration, and a stack of circular elastomeric pads disposed in said housing inwardly of said friction shoes for resisting inward movement thereof and being guidingly retained in stacked columnar relationshp by said generally cylindrical configuration defined by said first and second series of guide formations.

4. In a friction draft gear of the type which is characterized by a generally hexagonal housing having one end provided with a closure and an open opposite end provided with a tapered internal action surface of rounded hexagonal cross section, by a series of friction shoes in the open end of said housing and operably associated with said friction surface thereof, and by a wedge member engageable with said shoes and adapted for actuating same upon movement thereof inwardly of said housing, the improvement which comprises, in combination therewith, a first series of internal circumferentially spaced longitudinally extending guide formations having arcuate inner surfaces formed in said housing, said guide formations being spaced inwardly of said hexagonal friction surface and terminating at said end closure whereby to define a generally cylindrical configuration in said housing, a transition wall section disposed inwardly of and immediately adjacent to said hexagonal friction surface for blending same into said generally cylindrical configuration, said transition wall section being characterized by a second series of internal circumferentially spaced longitudinally extending guide formations having arcuate inner surfaces which provide a longitudinal extension of said generally cylindrical configuration, a stack of circular elastomeric pads disposed in said housing inwardly of said friction shoes for resisting inward movement thereof and being guidingly retained in stacked columnar relationship by said generally cylindrical configuration defined by said first and second series of guide formations, and a generally circular follower member having guide means formed on the periphery thereof guidingly disposed for longitudinal movement in said transition wall section intermediate said friction shoes and said stack of pads.

5. In a friction draft gear of the type which is characterized by a generally hexagonal housing having one end provided with a closure and an open opposite end provided with a tapered internal friction surface of rounded hexagonal cross section, by a series of friction shoes in the open end of said housing and operably associated with said friction surface thereof, and by a wedge member engageable with said shoes and adapted for actuating same upon movement thereof inwardly of said housing, the improvement which comprises, in combination therewith, a series of four internal circumferentially and equidistantly spaced longitudinally extending guide formations having arcuate inner surfaces formed in said housing inwardly of said hexagonal friction surface whereby to define a non-continuous cylindrical configuration, a transition inner wall section disposed inwardly of and immediately adjacent to said hexagonal friction surface for blending same into said cylindrical configuration, said transition wall section being characterized by a series of three internal circumferentially and equidistantly spaced longitudinally extending guide ribs having arcuate inner surfaces which define a longitudinal extension of said non-continuous cylindrical configuration with two of said guide ribs being longitudinally contiguous with two of said guide formations, and a stack of circular elastomeric pads disposed in said housing inwardly of said friction shoes for resisting inward movement thereof and being guidingly retained in stacked columnar relationship by said non-continuous cylindrical configuration defined by said series of guide formations and said series of guide ribs.

6. In a friction draft gear of the type which is characterized by a generally hexagonal housing having one end provided with a closure and an open opposite end provided with a tapered internal friction surface of rounded hexagonal cross section, by a series of friction shoes in the open end of said housing and operably associated with said friction surface thereof, and by a wedge member engageable with said shoes and adapted for actuating same upon movement thereof inwardly of said housing, the improvement which comprises, in combination therewith, a stack of circular elastomeric pads disposed in said housing inwardly of the friction shoes for resisting movement of said shoes inwardly of said housing, internal guide means formed in said housing and defining an inner surface of generally cylindrical configuration, said generally cylindrical inner surface being spaced inwardly of said hexagonal friction surface and being adapted for guidingly retaining said circular pads in stacked columnar relationship during longitudinal movement thereof, and an inner transition wall configuration disposed between said hexagonal friction surface and said generally cylindrical configuration defined by said internal guide means, said transition wall configuration being characterized by a non-tapered hexagonal sleeve portion which extends inwardly of the housing from the inner end of said tapered hexagonal friction surface and terminates in an angular shoulder which blends said sleeve portion into said generally cylindrical configuration defined by said internal guide means.

7. A generally hexagonal draft gear housing having an open outer end and a closed inner end comprising, in combination, a tapered internal friction wall section of rounded hexagonal cross section formed at the open end of said housing for receiving a series of friction shoes, a generally cylindrical non-tapered inner wall section spaced inwardly of said generally hexagonal tapered wall section and terminating at said closed inner end of the housing for guidingly retaining a plurality of circular elastomeric pads disposed in said housing in stacked columnar relationship, said stack of pads serving to resist inward movement of said friction shoes, and a generally hexagonal non-tapered internal transition wall section disposed between said generally hexagonal tapered wall section and said generally cylindrical non-tapered wall section for blending same into each other.

8. A generally hexagonal draft gear housing having an open outer end and a closed inner end comprising, in combination, a tapered internal frictional wall section of rounded hexagonal cross section formed at the open end of said housing for receiving a series of friction shoes, an internal generally cylindrical wall section spaced inwardly of said hexagonal tapered friction wall section and terminating at said closed inner end of the housing for guidingly retaining a plurality of circular elastomeric pads disposed in said housing in stacked columnar relationship, said stack of pads serving to resist inward movement of said friction shoes, and an inner transition wall section disposed between said hexagonal tapered friction wall section and said generally cylindrical wall section and characterized by a non-tapered hexagonal sleeve portion which extends inwardly of the housing from the inner end of said tapered hexagonal friction wall section and by an inwardly directed angular shoulder portion which is disposed between the inner end of said hexagonal sleeve portion and the outer end of said generally cylindrical wall section whereby to blend same one into the other.

9. A generally hexagonal draft gear housing having an open outer end and a closed inner end comprising, in combination, a tapered internal friction wall section of rounded hexagonal cross section formed at the open end of said housing for receiving a series of friction shoes, a generally cylindrical inner wall section spaced inwardly of said generally hexagonal wall section and terminating at said closed inner end of the housing for guidingly returning a plurality of circular elastomeric pads disposed in said housing in stacked columnar relationship, said stack of pads serving to resist inward movement of said friction shoes, a non-tapered internal transition wall section disposed between said generally hexagonal tapered wall section and said generally cylindrical wall section for blending same one into the other, and a series of internal circumferentially spaced longitudinally extending guide ribs having arcuate inner surfaces integrally formed in said transition wall section and defining a longitudinal extension of said generally cylindrical wall section in a direction toward said friction wall section at the open end of said housing whereby to provide guide means for the outermost pads in said stack which are normally disposed in said transition wall section.

10. A generally hexagonal draft gear housing having an open outer end and a closed inner end comprising, in combination, a tapered internal friction wall section of rounded hexagonal cross section formed at the open end of said housing for receiving a series of friction shoes, a generally cylindrical inner wall section spaced inwardly of said generally hexagonal wall section and terminating at the closed inner end of the housing for guidingly retaining a plurality of circular elastomeric pads disposed in said housing in stacked columnar relationship for resisting inward movement of said friction shoes, said generally cylindrical inner wall section being defined by a series of circumferentially spaced longitudinally extending internal guide formations having arcuate inner surfaces, and an internal transition wall section disposed between said generally hexagonal wall section and said generally cylindrical wall section for blending same into each other.

11. A generally hexagonal draft gear housing having an open outer end and a closed inner end comprising, in combination, a tapered internal friction wall section of rounded hexagonal cross section formed at the open end of said housing for receiving a series of friction shoes, a generally cylindrical inner wall section spaced inwardly of said generally hexagonal wall section and terminating at the closed inner end of the housing for guidingly retaining a plurality of circular elastomeric pads disposed in said housing in stacked columnar relationship for resisting inward movement of said friction shoes, said generally cylindrical inner wall section being defined by a series of circumferentially spaced longitudinally extending internal guide formations having arcuate inner surfaces, an internal transition wall section disposed between said generally hexagonal wall section and said generally cylindrical wall section for blending same one into the other, and a series of circumferentially spaced longitudinally extending internal guide ribs having arcuate inner surfaces integrally formed in said transition wall section and defining a longitudinal extension of said generally cylindrical wall section in a direction toward said friction wall section whereby to provide guide means for the outermost pads in said stack which are normally disposed in said transition wall section.

12. A draft gear housing as recited in claim 11 wherein said generally cylindrical inner wall section is defined by four circumferentially and equidistantly spaced guide formations and wherein said longitudinal extension thereof in said intenal transition wall section is defined by three circumferentially and equidistantly spaced guide ribs, with two of said guide ribs being longitudinally aligned and contiguous with two of said guide formations.

13. A friction draft gear comprising, in combination, a generally hexagonal axially bored housing having one end open and the opposite end provided with a fixedly attached closure, a tapered internal friction surface of rounded hexagonal cross section formed in said bore at the open end of said housing, a series of circumferentially spaced inwardly directed lugs at the open end of said housing, means defining a generally cylindrical inner housing configuration which is spaced inwardly of said non-tapered hexagonal friction surface and which terminates at said end closure, a transition inner wall section which is disposed between said hexagonal friction surface and said generally cylindrical configuration for blending same one into the other, said transition wall section being characterized by a non-tapered rounded hexagonal sleeve portion which intersects the inner end of said tapered hexagonal friction surface, by an inwardly directed angular shoulder portion which blends the inner end of said hexagonal sleeve portion into the outer end of said generally cylindrical housing configuration, and by a series of circumferentially spaced longitudinally extending inner guide ribs having arcuate inner surfaces which are longitudinally aligned with said series of lugs at the open end of said housing and which define a longitudinal extension of said generally cylindrical housing configuration into said transition wall section, a plurality of circular elastomeric pads which are insertable into said housing through said open end thereof by canting same past said lugs and which are guidingly retained in stacked columnar relationship by said generally cylindrical inner housing configuration, a generally circular follower plate disposed against the outer end of said stack of pads and having peripheral guide means thereon for guiding engagement in said hexagonal sleeve portion of said transition wall section during longitudinal movement of same, a series of circumferentially spaced notches formed on the periphery of said follower plate and corresponding in number and location to said lugs at the open end of said housing whereby to facilitate assembly of said follower plate into said housing, a series of friction shoes disposed in said open end of said housing in frictional engagement with said tapered friction surface thereof and with their inner ends in engagement with the outer face of said follower plate, and a wedge member in actuating engagement with said shoes and having outwardly directed radial lugs engageable behind said lugs at the open end of said housing whereby to retain said wedge, friction shoes, follower plate and pads in assembled relationship in said housing.

14. The improvement in a friction draft gear as recited in claim 1 wherein said elestomeric pads are formed of natural rubber.

15. The improvement in a friction draft gear as recited in claim 1 wherein said elastomeric pads are formed of neothane.

16. The improvement in a friction draft gear as recited in claim 1 wherein said elastomeric pads are formed of polyurethane.

References Cited by the Examiner

UNITED STATES PATENTS

| 2,118,150 | 5/1938 | Brinkley | 213—40 |
|---|---|---|---|
| 2,160,417 | 5/1939 | Hedgcock | 213—32 |
| 2,623,743 | 12/1952 | Mulcahy | 276—9(213–32 X) |
| 2,670,856 | 3/1954 | Cottrell | 213—32 |
| 2,764,300 | 9/1956 | Withall | 213—32 |
| 2,808,945 | 10/1957 | Danielson | 213—22 |
| 2,903,143 | 9/1959 | Gadbois | 213—22 |
| 2,906,415 | 9/1959 | Andrews et al. | 213—24 |
| 3,144,247 | 8/1964 | Szonn et al. | 267—63 |

FOREIGN PATENTS

| 196,441 | 3/1958 | Austria |
|---|---|---|
| 540,674 | 5/1957 | Canada. |

ARTHUR L. LA POINT, *Primary Examiner.*

LEO QUACKENBUSH, *Examiner.*

UNITED STATES PATENT OFFICE
CERTIFICATE OF CORRECTION

Patent No. 3,227,288                      January 4, 1966

Harry W. Mulcahy et al.

It is hereby certified that error appears in the above numbered patent requiring correction and that the said Letters Patent should read as corrected below.

Column 1, line 43, strike out "of"; line 66, for "wadge-" read -- wedge- --; column 2, line 69, after "addition" insert -- to --; line 70, for "fractional" read -- frictional --; column 3, line 40, for "stacker" read -- stacked --; column 5, line 9, for "50,00" read -- 50,000 --; column 6, line 27, for "action" read -- friction --; column 8, line 13, for "returning' read -- retaining --; line 75, for "intenal" read -- internal --; column 10, line 13, for "elestompric" read -- elastomeric --

Signed and sealed this 6th day of December 1966.

(SEAL)

Attest:

ERNEST W. SWIDER                         EDWARD J. BRENNER
Attesting Officer                            Commissioner of Patents